(12) United States Patent
Kumon et al.

(10) Patent No.: US 6,999,024 B2
(45) Date of Patent: Feb. 14, 2006

(54) METHOD AND APPARATUS FOR DISCRIMINATING A TARGET OBJECTIVE, AND RELATED PROGRAM

(75) Inventors: Hiroaki Kumon, Kariya (JP); Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 10/730,270

(22) Filed: Dec. 9, 2003

(65) Prior Publication Data

US 2004/0246167 A1 Dec. 9, 2004

(30) Foreign Application Priority Data

Dec. 10, 2002 (JP) ............................. 2002-358198

(51) Int. Cl.
*G01S 13/93* (2006.01)

(52) U.S. Cl. ............................. 342/70; 342/71; 342/72; 342/90; 342/192; 342/196

(58) Field of Classification Search ............ 342/70–72, 342/27, 28, 90, 159, 162, 192, 195, 196
See application file for complete search history.

(56) References Cited

U.S. PATENT DOCUMENTS

| 4,124,848 | A | * | 11/1978 | Clark et al. ................. 340/524 |
| 6,583,403 | B1 | | 6/2003 | Koike et al. |
| 2004/0082342 | A1 | * | 4/2004 | Toguchi et al. ........... 455/456.1 |
| 2004/0119633 | A1 | * | 6/2004 | Oswald et al. ................ 342/70 |
| 2004/0246167 | A1 | * | 12/2004 | Kumon et al. ................ 342/70 |

FOREIGN PATENT DOCUMENTS

| JP | 60-61669 | 4/1985 |
| JP | 5-27018 | 2/1993 |
| JP | 5-249230 | 9/1993 |
| JP | 7-55923 | 3/1995 |
| JP | 8-233936 | 9/1996 |
| JP | 11-64500 | 3/1999 |
| JP | 11-271441 | 10/1999 |
| JP | 2001-191876 | 7/2001 |
| JP | 2002-40139 | 2/2002 |
| JP | 2002-148334 | 5/2002 |

OTHER PUBLICATIONS

"Millimeter wave scattering characteristics and radar cross section measurements of common roadway objects", Zoratti-P et al, Collision Avoidance and Automated Traffic Management Sensors, Oct. 25-26, 1995 vol. 2592, p. 169-79.*

* cited by examiner

*Primary Examiner*—John B. Sotomayor
(74) *Attorney, Agent, or Firm*—Posz Law Group, PLC

(57) ABSTRACT

An average power value of a peak pair corresponding to a subjective target objective is converted into a radar cross section, to calculate a normalized average power value NP and a standard deviation DP representing a temporal dispersion of a power difference between peak pairs. When the value NP is larger than an automotive vehicle discriminating threshold THnp, the attribute of the subjective target objective is set to "automotive vehicle." When the value NP is not larger than the threshold THnp and the deviation DP is larger than a human objective discriminating threshold THdp, the attribute of the subjective target objective is set to "non-vehicle objective: human objective." Furthermore, when the value NP is not larger than the threshold THnp and the deviation DP is not larger than the threshold THdp, the attribute of the subjective target objective is set to "non-vehicle objective: non-human."

18 Claims, 11 Drawing Sheets

METHOD AND APPARATUS FOR DISCRIMINATING A TARGET OBJECTIVE, AND RELATED PROGRAM

BACKGROUND OF THE INVENTION

This invention relates to a method and an apparatus for detecting a target objective based on radio waves reflected from the target objective in response to transmission of the radio waves, and also relates to a method and an apparatus for discriminating a type of the detected target objective.

The FMCW type radar apparatus using millimeter radio waves (hereinafter, referred to as "FMCW radar") is known as one of conventional radar apparatuses used for measuring and controlling a distance between traveling automotive vehicles.

The FMCW radar uses radio waves which are frequency modulated so as to have an ascending section in which the frequency gradually increases and a descending section in which the frequency gradually decreases. In each of the ascending section and the descending section, a signal component where the signal intensity becomes a peak (hereinafter, referred to as "peak frequency component") is extracted based on a beat signal obtained by mixing transmitted and received radio wave signals. Then, a pair of peak frequency components originated from the same target objective is specified. And, the distance and a relative speed of the target objective are obtained based on the specified pair of peak frequency components.

In recent years, as considered in airbag controls performed in case of vehicle collision, it is preferable to optimize the control of an electronically controlled device according to the type of a target objective (e.g., large-sized vehicle/normal vehicle/non-vehicle objective). Regarding the method for discriminating the type of a detected target objective, it is for example possible to use a comparison between a signal intensity distribution of reflected radio waves relative to the scanning angle of a radio wave beam (which can de referred to as temporal variation of signal intensity) and a pre-stored model pattern, as disclosed in the Japanese Patent Application Laid-open No. 11-271441 (1999). It is also possible to use a comparison between a signal intensity distribution of reflected radio waves relative to the frequency (which is a so-called frequency spectrum) and a pre-stored model pattern, as disclosed in the Japanese Patent Application Laid-open No. 5-27018(1993).

Furthermore, instead of using the radar, it is possible to use an image sensor to specify the shape of a target objective by processing the image data obtained from this image sensor and compare the specified shape with a pre-stored model pattern to accurately discriminate the type of a target objective.

However, according to each of the above-described methods, it is necessary to perform the comparison of the measured or detected data with a predetermined model pattern (so-called pattern matching). In other words, a huge amount of computation data must be processed. Furthermore, the signal intensity distribution has a tendency of momentarily changing depending on surrounding environments and others. Accordingly, preparing accurate model patterns is difficult.

Furthermore, from the standpoint of enhancing vehicle safety in a traveling condition, it is desirable to discriminate each detected objective between an automotive vehicle and a non-vehicle objective and also discriminate the type of each non-vehicle objective between a human and others.

However, in the case that the target objective is identified as being a non-vehicle objective, this target objective will be one of various kinds of objectives different in shape and size. The detected objective may be identical with a human in size or largeness or in signal intensity distribution. Accordingly, it is very difficult to accurately discriminate the difference between a human objective and a non-human objective according to the above-described conventional methods.

Furthermore, a human objective is different from an automotive vehicle or a roadside object in that the shape or contour is not constant and is possibly changing momentarily when observed. It means that many model patterns according to the position or attitude of a human objective will be necessary in discriminating the type of a detected target objective. Especially, according to the method requiring processing of image data obtained from an image sensor, the processing amount will greatly increase in accordance with the number of model patterns to be compared. The response will be worsened due to increase of processing amount. It is therefore not preferable to use this system for an automotive vehicle which requires speedy processing for avoiding collisions or accidents.

SUMMARY OF THE INVENTION

In view of the above-described problems, the present invention has a first object to reduce the processing amount required to make accurate judgment as to whether a detected target objective is an automotive vehicle or not. Furthermore, the present invention has a second object to reduce the processing amount required in discriminating the difference between a human objective and a non-human objective.

In order to accomplish the above and other related objects, the present invention provides a first method for discriminating a target objective including a step of transmitting and receiving radio waves for detecting a target objective based on radio waves reflected from the target objective, a step of obtaining vehicle judgment data based on a receiving intensity of reflected radio waves from the target objective, as a value expressed in terms of a radar cross section equivalent to the receiving intensity, and a step of making a judgment as to whether the target objective is an automotive vehicle or not based on the automotive vehicle judgment data.

Namely, even if a target objective is the same, the receiving intensity of detected reflected radio waves is momentarily variable depending on the distance of a target objective. However, converting the receiving intensity into the radar cross section makes it possible to evaluate the receiving intensity without being adversely influenced by the distance of the target objective.

The radar cross section is a parameter $\alpha$ shown in the following radar equation (1).

$$Pr = \frac{Pt \cdot Gt \cdot \sigma}{(4\pi \cdot R^2)^2} \cdot Ar \qquad (1)$$

In the above equation (1), Pt represents a transmission output, Gt represents the antenna gain of a transmission antenna, R represents the distance of a target objective, Ar represents the aperture area of a receiving antenna, and Pr represents a receiving electric power of the receiving antenna. FIG. 10 shows the result of measurement with respect to the relationship between the distance of a target objective and a receiving electric power, which is measured by transmitting radio waves to various target objectives positioned at different distances and measuring the receiving intensity of reflected radio waves.

FIG. 10 shows the change of receiving intensity with increasing distance of a virtual objective having a constant radar cross section. In the graph shown in FIG. 10, each region surrounded by an elliptic circle is a region where the distribution of receiving intensities is recognized in a case that the target objective is an automotive vehicle and in a case that target objective is a human objective.

In this measurement, the tested automotive vehicles are a variety of 13 vehicles ranging from light-load vehicles to wagons which are mutually different in size and shape. The measurement of each tested automotive vehicle was done at a predetermined measuring point being 15 m to 50 m distant from the tested vehicle, under a condition that the tested vehicle was approaching or departing with the relative speed of −20 Km/h to +20 Km/h. Regarding the measurement of a human objective, the measurement was done at a predetermined measuring point being 5 m to 25 m distant from the human objective under a condition that the human objective was approaching, departing, or crossing with normal walking speeds, and also under a condition that human objective was stationary, and also under a condition that the human objective was facing forward or backward. Furthermore, although no measurement result is shown, the measurement of non-vehicle objectives other than the human objective, such as poles, fences, park steps, and bicycles, was done at a predetermined measuring point being 5 m to 30 m distant from the non-vehicle objective under a condition that the measured bicycle was approaching or departing with the relative speed of −10 Km to +10 Km.

As shown in FIG. 10, in the case that the target objective is an automotive vehicle, converting the receiving intensity of the radio waves reflected from the target objective into the radar cross section makes it possible to locate the distribution of the signal intensities within a constant region (i.e., within a range of −5 dBsm to 25 dBsm according to the measurement result) regardless of the type of vehicles. Furthermore, in the case that the target objective is a human objective, the distribution of the signal intensities locates within a constant region (i.e., within a range of −20 dBsm to −5 dBsm according to the measurement result) regardless of the direction or shifting condition of the human objective. In this case, the upper boundary of the human objective's distribution region is substantially identical with the lower boundary of the automotive vehicle's distribution region. Furthermore, in the case that the target objective is a non-vehicle objective other than the human objective, it was confirmed that the distribution of the signal intensities locates in the same region as that of the human objective's distribution region. In this case, the dimension 'dBsm' is the unit of radar cross section which is expressed by a ratio of the reflection amount from the target objective (i.e., receiving intensity) to a reflection amount from an iron ball having a diameter of 2 m.

Namely, when the radar cross section converted from a receiving intensity is equal to or larger than the boundary value between the automotive vehicle's distribution region and the human objective's distribution region (i.e., −5 dBsm according to the measurement result), there is a higher possibility that the target objective is an automotive vehicle. Accordingly, based on this fact, it becomes possible to accurately make a judgment as to whether the target objective is an automotive vehicle or not.

Next, the present invention provides a second method for discriminating a target objective including a step of transmitting and receiving radio waves for detecting a target objective based on radio waves reflected from the target objective, the radio waves being modulated so as to have an ascending section in which the frequency gradually increases and a descending section in which the frequency gradually decreases, a step of obtaining human objective judgment data based on a receiving intensity of reflected radio waves from the target objective obtained in each of the ascending section and the descending section, as a value representing temporal dispersion of the receiving intensity difference between the ascending section and the descending section, and a step of making a judgment as to whether the target objective is a human objective or not based on the human objective judgment data.

Namely, the inventors of this invention obtained the receiving intensity difference between the ascending section and the descending section with respect to the same target objective, and measured the temporal dispersion of the obtained receiving intensity difference. As shown in FIGS. 11A and 11B, when the target objective is a human objective, the temporal dispersion of the receiving intensity difference is large compared with a case that the target objective is a non-human objective.

FIG. 11A is a graph showing the result of measurement with respect to the variation of receiving intensity difference in a case that the target objective is a human objective as well as in a case that target objective is an automotive vehicle. FIG. 11B is a graph showing the standard deviation of the temporal dispersion with respect to various target objectives, calculated from the measurement result of the temporal dispersion of the receiving intensity difference.

Namely, when the temporal dispersion of the receiving intensity difference is equal to or larger than a regulated value being set somewhere in a range from 0.6 to 1.0 (e.g., 0.8), there is a higher possibility that the target objective is a human objective. From this tendency or likelihood, it is possible to accurately make a judgment as to whether the target objective is a human objective or not. Such a large temporal dispersion is obtained only when the target objective is a human objective, because the shape or contour of a human objective is not constant and is often or momentarily varying in response to the change of attitude.

Furthermore, the present invention provides a first target objective discriminating system which includes target objective detecting means, automotive vehicle judgment data producing means, and automotive vehicle discriminating means. The target objective detecting means transmits and receives radio waves for detecting a target objective based on radio waves reflected from the target objective. The automotive vehicle judgment data producing means produces automotive vehicle judgment data based on a receiving intensity of reflected radio waves from the target objective detected by the target objective detecting means. The automotive vehicle judgment data is a value expressed in terms of a radar cross section equivalent to the receiving intensity. The automotive vehicle discriminating means makes a judgment as to whether the target objective is an automotive vehicle or not based on the automotive vehicle judgment data.

Namely, the first target objective discriminating system according to the present invention embodies the above-described first method for discriminating a target objective and realizes the effects brought by this first method of the present invention.

Preferably, the first target objective discriminating system further includes image processing means for detecting the target objective and specifying the type of the target objective based on image data obtained by picking up an image of an area including at least a detection area of the target objective detecting means. And, the image processing means makes a judgment as to whether the target objective is a human objective or not when the automotive vehicle discriminating means identifies the target objective as being not an automotive vehicle.

In this case, it becomes possible to reduce the number of target objectives to be discriminated by the image processing means in making a judgment as to whether the target objective is a human objective or not. The processing amount by the image processing means can be greatly reduced.

Next, the present invention provides a second target objective discriminating system which includes target objective detecting means, human objective judgment data producing means, and human objective discriminating means. The target objective detecting means transmits and receives radio waves for detecting a target objective based on radio waves reflected from the target objective. The radio waves are modulated so as to have an ascending section in which the frequency gradually increases and a descending section in which the frequency gradually decreases. The human objective judgment data producing means produces human objective judgment data based on a receiving intensity of reflected radio waves from the target objective detected by the target objective detecting means in each of the ascending section and the descending section. The human objective judgment data is a value representing temporal dispersion width in the receiving intensity difference between the ascending section and the descending section. And, the human objective discriminating means makes a judgment as to whether the target objective is a human objective or not based on the human objective judgment data.

Namely, the second target objective discriminating system according to the present invention embodies the above-described second method for discriminating a target objective and realizes the effects brought by this second method of the present invention.

Preferably, the human objective judgment data producing means uses a standard deviation as the human objective judgment data to be produced. Alternatively, any other data capable of evaluating the dispersion width can be used as the human objective judgment data.

Preferably, the second target objective discriminating system further includes automotive vehicle judgment data producing means for producing automotive vehicle judgment data based on a receiving intensity of reflected radio waves from the target objective detected by the target objective detecting means. The automotive vehicle judgment data is a value expressed in terms of a radar cross section equivalent to the receiving intensity. And, this system further includes automotive vehicle discriminating means for making a judgment as to whether the target objective is an automotive vehicle or not based on the automotive vehicle judgment data.

In this case, it is possible to efficiently identify each of automotive vehicles, human objectives, non-vehicle objectives, and non-human objectives by performing discrimination by the human objective discriminating means only when the target objective identified by the automotive vehicle discriminating means is a non-vehicle objective, or by performing discrimination by the automotive vehicle discriminating means only when the target objective identified by the human objective discriminating means is a non-human objective.

Preferably, the automotive vehicle judgment data producing means uses an average of received signal intensities detected in the ascending section and the descending section as the receiving intensity.

Preferably, in the second target objective discriminating system, the target objective detecting means serves as a primary target objective detecting means. And, the second target objective discriminating system further includes secondary target objective detecting means for detecting a target objective existing in a detection area of the primary target objective detecting means based on a method different from that used by the primary target objective detecting means and for specifying an attribute of the detected target objective.

More specifically, the primary target objective detecting means includes peak extracting means, predicting means, and extraction threshold varying means. The peak extracting means extracts a peak frequency component in each of the ascending section and the descending section based on a beat signal which is obtained by mixing transmitted and received radio wave signals. The peak frequency component represents a frequency component where the signal intensity becomes a peak and larger than a predetermined extraction threshold. The target objective is detected by combining peak frequency components extracted by the peak extracting means.

In this case, the predicting means predicts, based on the position of the target objective detected by the secondary target objective detecting means, a frequency region where the peak frequency component corresponding to the target objective is extracted by the peak extracting means. And, the extraction threshold varying means varies the extraction threshold used in the peak extracting means at the frequency region predicted by the predicting means, based on the attribute of the target objective specified by the secondary target objective detecting means.

Namely, estimating the size or largeness of the peak (i.e. receiving intensity) extracted by the peak extracting means is feasible based on the attribute of the target objective to a certain extent. Accordingly, it becomes possible to set an optimum extraction threshold suitable for the receiving intensity of each target objective. More specifically, for example, when the attribute of the target objective specified by the secondary target objective detecting means is an automotive vehicle, the extraction threshold is set to be higher. On the other hand, when the attribute of the target objective is a human vehicle, the extraction threshold is set to be lower. Thus, it becomes possible to surely extract all of necessary peaks to be extracted or, on the contrary, prevent any unnecessary peak from being erroneously extracted. Reliability in extracting the peaks can be improved. Accordingly, the extraction processing is not executed for the unnecessary peaks.

Preferably, the attribute to be specified by the secondary target objective recognizing means includes at least one of categories consisting of type, material, size or largeness of the target objective. In this case, the size or largeness of the target objective includes one of height, width, depth, and projected area on the screen, Moreover, the present invention provides a program or software installable in a computer system for causing the computer system to function as respective means constituting each target objective discriminating system described above. In this case, this program or software is, for example, stored or memorized in an appropriate recording medium, such as FD (i.e., floppy disk), MO (i.e., magneto-optical disc), DVD (digital video or versatile disc), CD-ROM (i.e., compact disc read-only memory), hard disk, and memory card, whose data are readable by the computer. The program or software is then loaded into the computer system and the computer functions or operates according to this program or software. It is also possible to incorporate a ROM or a backup RAM, or a comparable readable recording medium storing this program or software into the computer system. Furthermore, it is possible to download this program or software via a network from a database, a provider, or the like.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
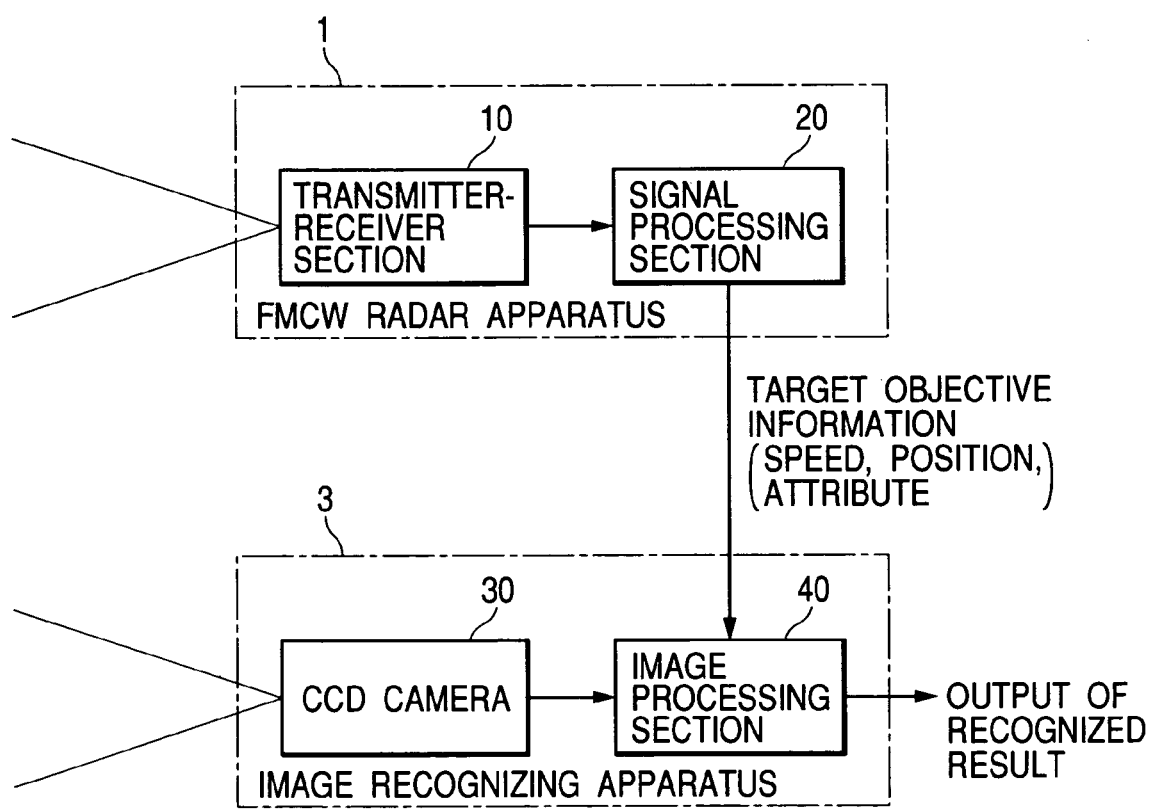
FIG. 1 is a block diagram showing the schematic arrangement of a target objective discriminating system in accordance with a first embodiment of the present invention.

Hereinafter, preferred embodiments of the present invention will be explained with reference to the attached drawings. FIG. 1 is a block diagram showing the schematic arrangement of a target objective discriminating system in accordance with a first embodiment of the present invention. As shown in FIG. 1, the target objective discriminating system of this embodiment includes a FMCW radar apparatus 1 consisting of a transmitter-receiver section 10 and a signal processing section 20. The transmitter-receiver section 10 transmits radio waves of millimeter-wave band modulated in such a manner that the frequency change with respect to elapsing time becomes a triangular shape. The transmitter-receiver section 10 receives the reflected radio waves to mix the transmitted and received signals to produce a beat signal.

The signal processing section 20 detects a target objective reflecting radio waves based on the beat signal produced by the transmitter-receiver section 10. The target objective discriminating system of this embodiment further includes an image recognizing apparatus 3 consisting of a CCD camera 30 and an image processing section 40. The CCD camera 30 is arranged so as to pick up an image of a predetermined area including a detection area of the FMCW radar apparatus 1. The image processing section 40 obtains detailed attribute information of the target objective detected by the FMCW radar apparatus 1 based on pixel data supplied from the CCD camera 30 and target objective information (later described) from the FMCW radar apparatus 1.

The transmitter-receiver section 10 includes a single transmission antenna and a plurality of receiving antennas (hereinafter, a combination of the transmission antenna and the receiving antennas is referred to as "channel") so that the beat signal can be produced for each channel. In practice, it is possible to provide a dedicated or exclusive mixer for each receiver (each channel) to simultaneously produce the beat signals of respective channels. Alternatively, it is possible to provide a single common mixer being successively connected to respective receiving antennas to produce the beat signals of respective channels in a time division manner.

Furthermore, the signal processing section 20 is chiefly constituted by a conventionally known microcomputer which usually includes CPU, ROM, and RAM. Furthermore, the signal processing section 20 includes one or more A/D converters for sampling the beat signals entered from the transmitter-receiver section 10, and a calculation processing apparatus (e.g., DSP) for executing fast-Fourier transform (i.e., FFT) processing and other processing. Then, based on the sampling data of the beat signals, the signal processing section 20 obtains the distance, a relative speed, and the direction of the target objective and also discriminates the type of the target objective (automotive vehicle/ non-vehicle objective; human objective/non-vehicle objective; and others).

The signal processing section 20 of the FMCW radar apparatus 1 can communicate with the image processing section 40 of the image recognizing apparatus 3 to exchange (i.e., input and output) their data with each other. The information obtained by the processing of the signal processing section 20 is supplied as target objective information to the image recognizing apparatus 3. On the other hand, the image processing section 40 makes a grouping of pixels based on pixel data supplied from the CCD camera 30 and extracts a region where the target objective is present. The shape of the extracted region is compared with the shape of model patterns being prepared beforehand to discriminate the type of the target objective and to obtain the height (e.g., vehicle height), width (e.g., vehicle width), area or the like of the target objective based on the size or largeness of the extracted region in the up-and-down direction as well as in the right-and-left direction.

The signal processing section 20 of the FMCW radar apparatus 1 repetitively executes the main signal processing which will be explained hereinafter with reference to the flowchart shown in FIG. 2. First of all, according to this main processing, the signal processing section 20 causes the transmitter-receiver section 10 to start transmitting radar waves (refer to step S11). Then, the signal processing section 20 executes sampling for inputting the beat signal supplied from the transmitter-receiver section 10 in response to the transmission of radar waves (refer to step S12). Then, the transmitter-receiver section 10 causes the transmitter-receiver section 10 to stop transmission of radar waves in response to termination of one complete period of modulation consisting of an ascending section in which the frequency gradually increases and a descending section in which the frequency gradually decreases (refer to step S13).

Next, the signal processing section 20 executes frequency analysis processing (in this case, FFT processing) applied on the sampling data taken in the step S12 to obtain the power spectrum of a beat signal in each of the ascending section and the descending section of respective channels (refer to step S14). Then, based on the obtained power spectrum, the signal processing section 20 executes frequency peak extraction processing to extract the frequency component where the power value becomes a peak (refer to step S15).

Figure 3:
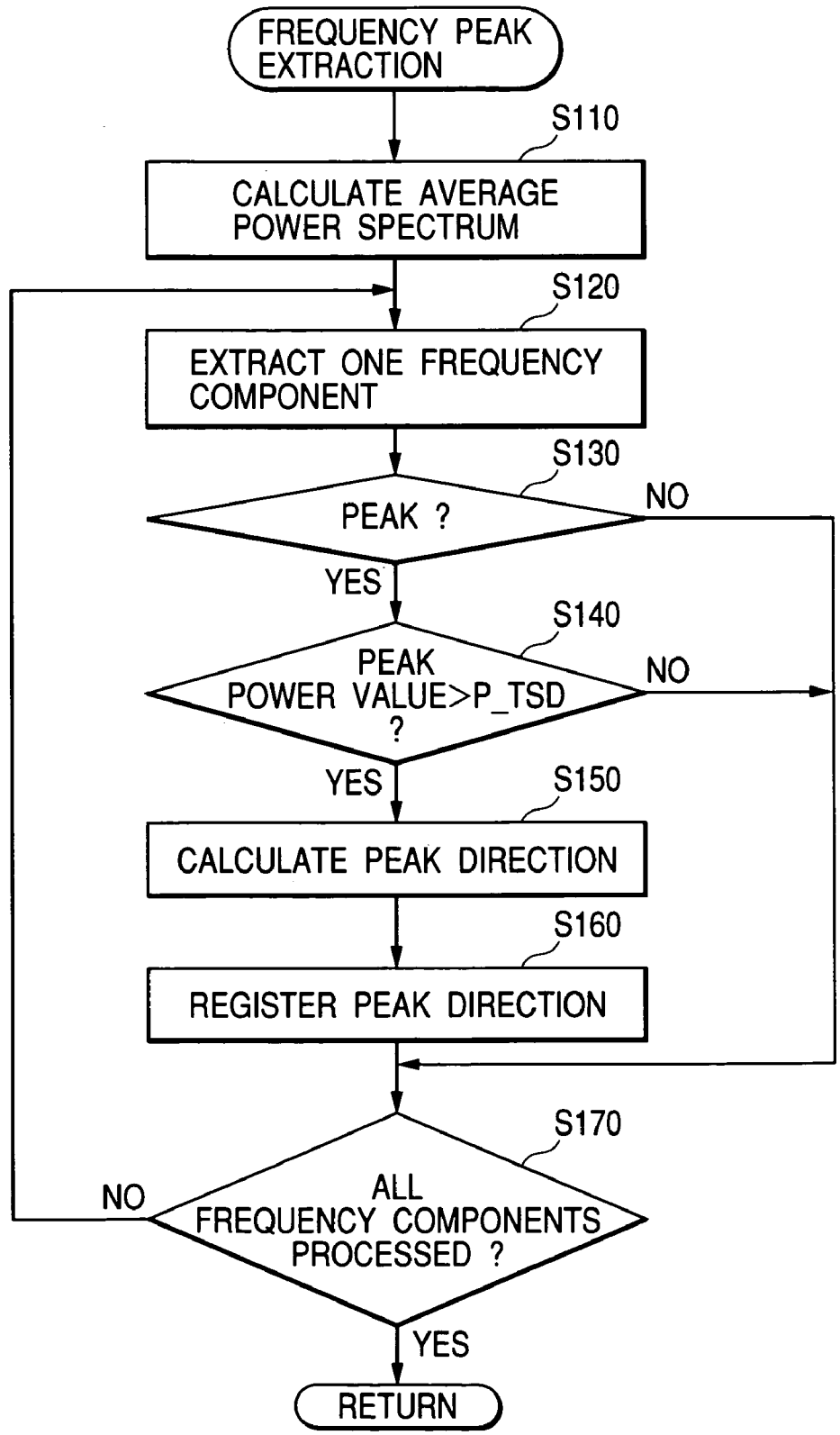
FIG. 3 is a flowchart showing the details of frequency peak extraction processing in accordance with the first embodiment of the present invention.

According to this frequency peak extraction processing, as shown in FIG. 3, the signal processing section 20 first obtains an average power spectrum by obtaining an average value of calculation result for each frequency component in each section of respective channels based on the calculation result obtained in the step S14 (refer to step S110). The signal processing section 20 successively extracts or selects one of the frequency components of the obtained average power spectrum (refer to step S120).

Next, the signal processing section 20 makes a judgment as to whether the power value of the detected frequency component is a peak or not (refer to step S130). When the power value of the detected frequency component is a peak (i.e., YES in step S130), the signal processing section 20 makes a judgment as to whether the power value of the frequency component (hereinafter, referred to as "peak frequency component") is larger than a predetermined extraction threshold P_TSD (refer to step S140). According to this embodiment, the extraction threshold P_TSD is set to a level (e.g., −20 dBsm or less) at which a peak corresponding to any non-vehicle objective target objective (especially, human objective) can be surely extracted based on the reflected radio waves.

When the power value of the peak frequency component is larger than the extraction threshold P_TSD (i.e., YES in step S140), the signal processing section 20 calculates the arriving direction of the radio waves generating this frequency component (hereinafter, referred to "peak direction") based on the phase of the peak frequency component obtained for each channel obtained in the previously described step S14 (refer to step S150). Then, the signal processing section 20 registers this peak direction together with the frequency of the peak frequency component (refer to step S160).

When the frequency component judged in the step S130 is not a peak (i.e., NO in step S130), or when the power value judged in step S140 is not larger than the extraction threshold P_TSD (i.e., NO in step S140), or after accomplishing the registration of the peak in the step S160, the signal processing section 20 makes a judgment as to whether the above-described processing (i.e., steps S130 to S160) is accomplished for all of the frequency components (refer to step S170). Then, when any unprocessed frequency component is present (i.e., NO in step S170), the control flow returns to the step S120 to repeat the same processing. On the other hand, when the processing for all of the frequency components is accomplished (i.e., YES in step S170), the signal processing section 20 terminates this routine.

Figure 2:
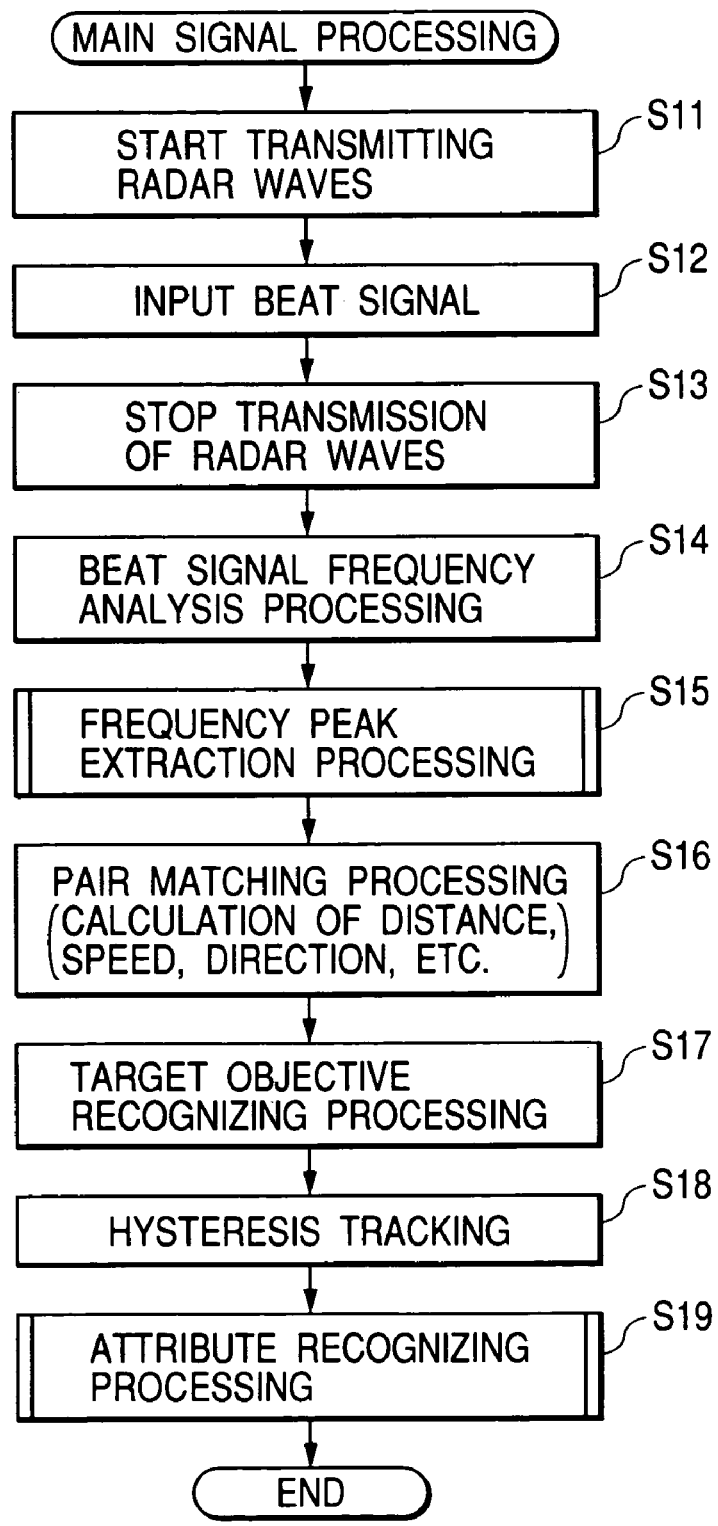
FIG. 2 is a flowchart showing the contents of main processing executed by a signal processing section in accordance with the first embodiment of the present invention.

After accomplishing the above-described frequency peak extraction processing, the control flow returns to the main processing shown in FIG. 2. The signal processing section 20 executes pair matching processing for combining peak frequency components of the same target objective based on the registered peak frequency components (refer to step S16). Then, the signal processing section 20 executes target objective recognizing processing for checking as to whether or not the peak frequency components combined by the pair matching processing are originated from the actual target objective (refer to step S17).

More specifically, according to the pair matching processing performed in the step S16, the signal processing section 20 makes a plurality of arbitrary pairs, each consisting of a peak of the ascending section and a peak of the descending section, based on the peak frequency components registered in the step S160. Then, among the peak pairs, the signal processing section 20 extracts or selects only the peak pairs each having a peak power difference (i.e., a power difference between the combined peaks) smaller than a predetermined power difference threshold PDIF and having a direction difference (i.e., an angular difference between the peak directions of the combined peak frequency components) smaller than a predetermined angular difference threshold ADIF. Furthermore, the signal processing section 20 calculates the relative speed and the distance with respect to respective extracted peak pairs. Then, the signal processing section 20 registers the matched peak pairs as official peak pairs only when the calculated distance is smaller than a predetermined upper-limit distance DMAX and the calculate relative speed is larger than a predetermined lower-limit speed VMIN and is smaller than a predetermined upper-limit speed VMAX.

In this case, the signal processing section 20 calculates the relative speed and the distance based on a peak frequency of the ascending section and a peak frequency of the descending section, as conventionally well-known in the field of FMCW type radars. In this case, it is preferable to calculate a lateral position of the target objective based on the calculated distance and an already calculated peak direction.

Furthermore, according to the target objective recognizing processing executed in the step S17, the signal processing section 20 calculates a predicted position and a predicted speed of the target objective based on the information of the peak pair registered in the previous execution of this processing (hereinafter, referred to as "previous cycle pair"). The signal processing section 20 compares the predicted position and the predicted speed with the position and the speed obtained based on the peak pair registered in the step S16 (hereinafter, referred to as "present cycle pair"). Then, the signal processing section 20 makes a judgment as to whether there is any hysteresis link between the previous cycle pair and the present cycle pair. Only when such hysteresis link is confirmed several times (e.g, a predetermined number of times being determined beforehand), the signal processing section 20 registers this target objective as a recognized target objective (refer to step S18).

Finally, the signal processing section 20 executes attribute recognizing processing for discriminating the type of the recognized target objective registered in the step S18 (refer to step S19). Subsequently, the signal processing section 20 terminates this processing.

Figure 4:
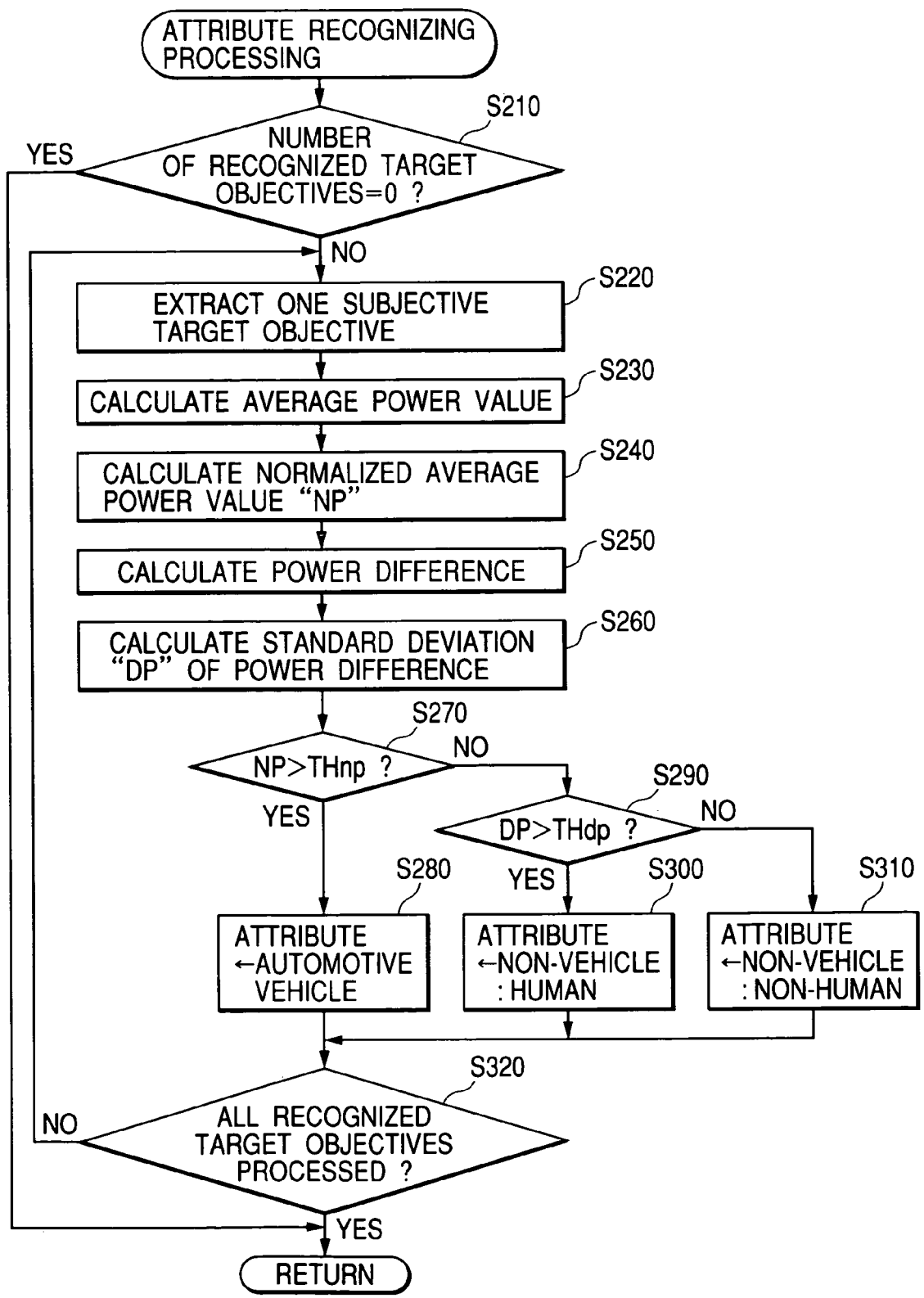
FIG. 4 is a flowchart showing the details of attribute discriminating processing in accordance with the first embodiment of the present invention.

FIG. 4 shows the contents of the attribute recognizing processing performed in the step S19. First, the signal processing section 20 makes a judgment as to whether the number of recognized target objectives registered in the step S18 is zero or not (refer to step S210). When the number of recognized target objectives registered in the step S18 is zero (i.e., YES in step S210), the signal processing section 20 terminates the attribute recognizing processing. On the other hand, when there in any recognized target objective, the signal processing section 20 extracts one of the recognized target objectives (refer to step S220) to execute the following processing (refer to step S220 to S320).

First, the signal processing section 20 calculates an average power value of the peak pair corresponding to the recognized target objective picked up in the step S220 (hereinafter, referred to as "subjective target objective" (refer to step S230). The signal processing section 20 calculates a normalized average power value NP by converting the average power value into a radar cross section based on the above-described equation 1 (refer to step S240). Furthermore, the signal processing section 20 calculates the power value difference between the peak pairs corresponding to the subjective target objective (hereinafter, simply referred to as "power difference") (refer to step S250). Then, the signal processing section 20 calculates a standard deviation DP representing a dispersion of the power difference based on the power difference calculated in the step S250 and an average value of the power difference obtained considering the hysteresis of the power difference with respect to the subjective target objective (step S260).

Then, the signal processing section 20 makes a judgment as to whether or not the normalized average power value NP obtained in the step S240 is larger than a predetermined automotive vehicle discriminating threshold THnp (refer to step S270). According to this embodiment, the automotive vehicle discriminating threshold THnp is set to be −5 dBsm. When the normalized average power value NP is larger than the automotive vehicle discriminating threshold THnp (i.e., YES in step S270), the signal processing section 20 determines the attribute of the subjective target objective as "automotive vehicle" (refer to step S280).

On the other hand, when the normalized average power value NP is equal to or less than the automotive vehicle discriminating threshold THnp (i.e., NO in step S270), the signal processing section 20 makes a judgment as to whether the standard deviation DP of the power difference obtained in the step S260 is larger than a predetermined human objective discriminating threshold THdp (refer to step S290). According to this embodiment, the human objective discriminating threshold THdp is set to be 0.8. When the standard deviation DP of the power difference is larger than the human objective discriminating threshold THdp (i.e., YES in step S290), the signal processing section 20 determines the attribute of the subjective target objective as "non-vehicle objective: human objective" (refer to step S300). Furthermore, when the standard deviation DP of the power difference is not larger than the human objective discriminating threshold THdp (i.e., NO in step S290), the signal processing section 20 determines the attribute of the subjective target objective as "non-vehicle objective: non-human objective" (refer to step S310).

After accomplishing the determination of the attribute of each subjective target objective in this manner, the signal processing section 20 makes a judgment as to whether or not the above-described processing (i.e., steps S230 to S310) is thoroughly executed for all of the recognized target objectives (refer to step S320). When any unprocessed recognized target objective is present (i.e., NO in step S320), the control flow returns to the step S220 to repeat the same processing. On the other hand, when the processing for all of the recognized target objectives is accomplished (i.e., YES in step S320), the signal processing section 20 terminates this routine.

Figure 5:
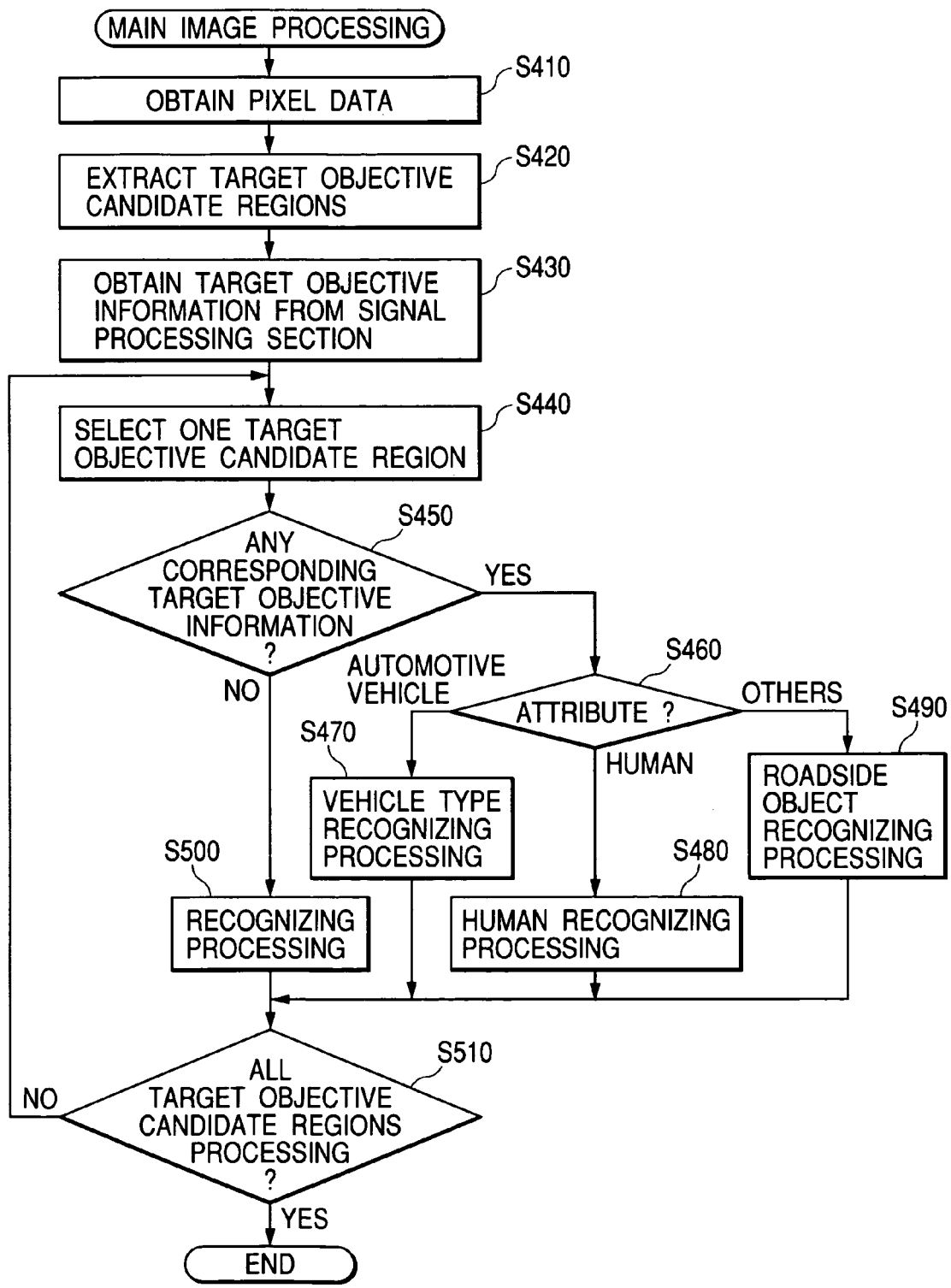
FIG. 5 is a flowchart showing the contents of main processing executed by an image processing section in accordance with the first embodiment of the present invention.

Next, the main processing repetitively executed by the image processing section 40 of the image recognizing apparatus 3 will be explained with reference to the flowchart shown in FIG. 5. First of all, according to this main image processing, the image processing section 40 obtains pixel data from the CCD camera 30 by an amount equal to one complete screen imaged by the CCD camera 30 (refer to step S410). Then, the image processing section 40 extracts target objective candidate regions by processing the obtained pixel data (refer to step S420). In this case, each target objective candidate region is a specific region of the screen where the presence of a target objective is predicted. Then, the image processing section 40 obtains target objective information from the signal processing section 20 (refer to step S430). The target objective information obtained from the signal processing section 20 is the information of the target objective detected in the FMCW radar apparatus 1. In this case, regarding the position of a target objective contained in the target objective information, the signal processing section 20 also obtains a mapped position of this target objective on an image picked up by the CCD camera 30.

Next, the image processing section 40 selects one of the target objective candidate regions extracted in the step S420 (refer to step S440) to execute the following processing (refer to step S450 to S500). First, the image processing section 40 makes a judgment as to whether any one of the target objective information obtained in the step S430 corresponds to the target objective candidate region selected in the step S440 (refer to step S450). More specifically, it is judged whether or not the position of the target objective candidate region agrees with a mapped position based on the target objective information obtained in the step S430.

When there is no target objective information corresponding to the extracted target objective candidate region, the image processing section 40 executes recognizing processing for discriminating or identifying the target objective (refer to step S500). On the other hand, when there is any target objective information corresponding to the extracted target objective candidate region, the image processing section 40 checks what kind of attribute is involved in this target objective information (refer to step S460). When the attribute is "automotive vehicle", there is a higher possibility or likelihood that the target objective imaged in this target objective candidate region is an automotive vehicle. Thus, the image processing section 40 executes vehicle type recognizing processing to mainly discriminate the type of the detected vehicle (refer to step S470). When the attribute is "non-vehicle objective: human objective", there is a higher possibility or likelihood that the target objective imaged in the target objective candidate region is a human objective. Thus, the image processing section 40 executes human recognizing processing to mainly check whether or not the target objective is an actual human (refer to step S480). Moreover, when the attribute is "non-vehicle objective: non-human objective", there is a higher possibility or likelihood that the target objective imaged in the target objective candidate region is something other than the vehicle and human objectives, such as a pole or the like standing on a roadside. Thus, the image processing section 40 executes roadside object recognizing processing to mainly check what kind of a roadside object is present (refer to step S490).

In each recognizing processing of the steps S470 to S500, the target objective candidate region is compared with a plurality of predetermined model patterns. For example, the model patterns are prepared for discriminating the type of automotive vehicles, humans, large roadside objects, small roadside objects and the like. For example, in the case of vehicle type recognizing processing, the recognizing processing of the target objective is performed in the order of automotive vehicle→large roadside object→human→small roadside object. According to the human objective recognizing processing, the recognizing processing of the target objective is performed in the order of human→small roadside object→automotive vehicle→large roadside object. According to the roadside object recognizing processing, the recognizing processing of the target objective is performed in the order of small roadside object human→large→roadside object→automotive vehicle. In this manner, the order of the model patterns to be compared in the recognizing processing is arbitrarily changed considering the attribute of each target objective. This is effective to reduce the processing amount required for extracting the one agreeing with the model pattern. According to the recognizing processing of the step S500, the order of the model patterns to be compared is appropriately changed based on the size (height, lateral width, area, etc.) of each target objective candidate region.

After accomplishing the recognizing processing applied to the target objective candidate regions (i.e., steps S470 to S500), the image processing section 40 makes a judgment as to whether the above-described processing (i.e., step S450 to S500) is completed for all of the target objective candidate regions (refer to step S510). When any unprocessed target objective candidate region is present (i.e., NO in step S510), the control flow returns to the step S440 to repeat the same processing. On the other hand, when the processing for all of the target objective candidate regions is accomplished (i.e., YES in step S510), the image processing section 40 terminates this routine.

As explained above, the FMCW radar apparatus 1 constituting part of the target objective discriminating system of this invention obtains the power values of peak frequency components about the same target objective detected in each of the ascending section and the descending section. The FMCW radar apparatus 1 obtains the normalized average power value NP which is an equivalent radar cross section converted from an average value of the power values and also obtains the standard deviation DP of the power value difference between the ascending section and the descending section. Then, the FMCW radar apparatus 1 uses the normalized average power value NP to check whether or not the target objective is an automotive vehicle. Furthermore, the FMCW radar apparatus 1 uses the standard deviation DP of the power value difference to check whether or not the target objective is a human objective.

Namely, when evaluated based on the normalized average power value NP, an automotive vehicle and a non-vehicle objective (such as a human or a roadside object) are apparently different from each other in the tendency or characteristics of its distribution. Furthermore, when evaluated based on the standard deviation DP of the power value difference, the human objective takes a larger value than other objectives. The target objective discriminating system of this embodiment discriminates the attribute of each target objective based on these facts.

Accordingly, the FMCW radar apparatus 1 constituting part of the target objective discriminating system of this invention does not require a huge amount of calculations in executing the pattern matching processing and others. Thus, it becomes possible to accurately discriminate the attribute of each target objective with a lesser amount of calculations.

Furthermore, the image recognizing apparatus 3 constituting part of the target objective discriminating system of this invention efficiently performs the recognizing processing with reference to the priority given to each objective. More specifically, in discriminating the target objective candidate region extracted based on the pixel data obtained by the CCD camera 30, when the FMCW radar apparatus 1 detects the target objective at the position corresponding to this target objective candidate region, the image recognizing apparatus 3 selects the processing for mainly recognizing the objective designated by the attribute of the target objective discriminated by the FMCW radar apparatus 1.

Accordingly, it becomes possible to greatly reduce the possibility that a target objective candidate region having a likelihood of imaging a human objective is uselessly compared with model patterns of automotive vehicles and other non-human objectives. Furthermore, even in a case that the attribute of each target objective is discriminated from the picked-up image, it becomes possible to greatly reduce the processing time by obtaining rough information of the target objective from the FMCW radar apparatus 1.

Furthermore, according to this embodiment, the processing executed in the steps S11 to S18 represents the operation of the target objective detecting means of the present invention. The processing executed in the steps S230 and S240 represents the operation of the automotive vehicle judgment data producing means of the present invention. The processing executed in the steps S250 and S260 represents the operation of the human objective judgment data producing means of the present invention. The processing executed in the step S270 represents the operation of the automotive vehicle discriminating means of the present invention. The processing executed in the step S290 represents the operation of the human objective discriminating means of the present invention. The image processing section 40 functions as the image processing means of the present invention.

Second Embodiment

Figure 6:
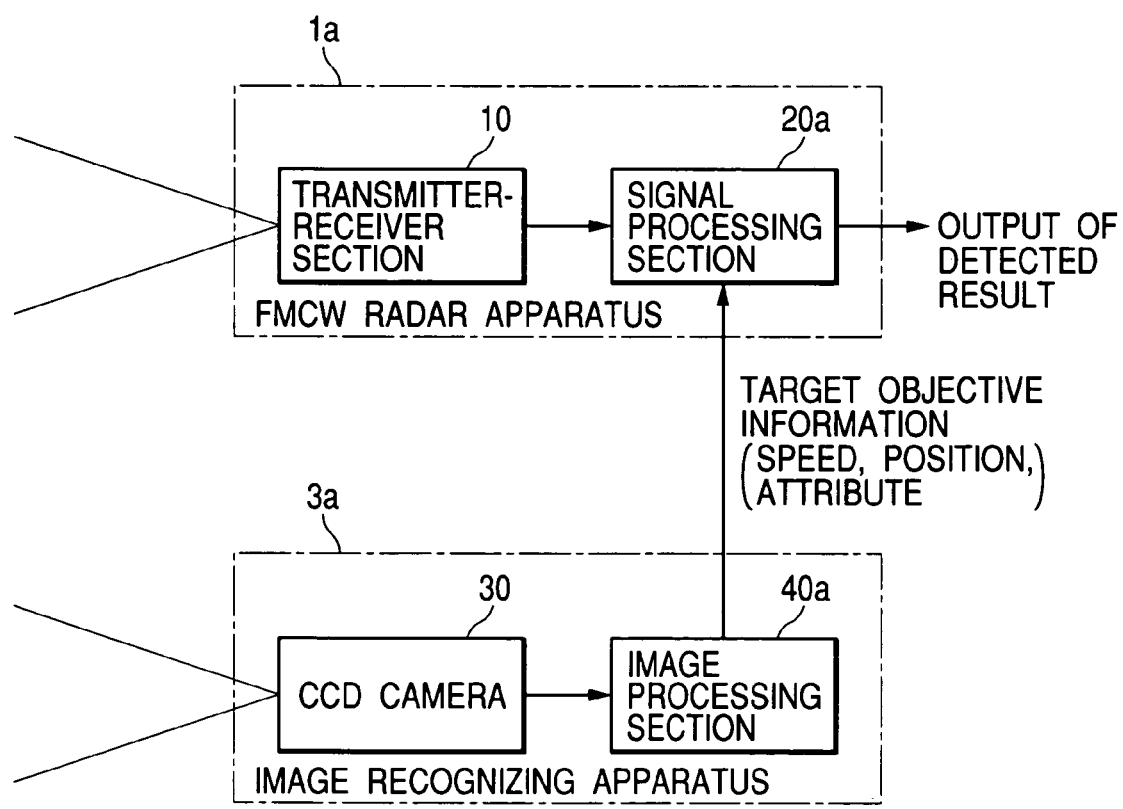
FIG. 6 is a block diagram showing the schematic arrangement of a target objective discriminating system in accordance with a second embodiment of the present invention.

FIG. 6 is a block diagram showing the schematic arrangement of a target objective discriminating system in accordance with a second embodiment of the present invention.

As shown in FIG. 6, like the above-described first embodiment, the target objective discriminating system in accordance with this embodiment includes a FMCW radar apparatus 1*a* consisting of the transmitter-receiver section 10 and a signal processing section 20*a* and an image recognizing apparatus 3*a* consisting of the CCD camera 30 and an image processing section 40*a*.

In this arrangement, the transmitter-receiver section 10 and the CCD camera 30 are identical with those of the first embodiment disclosed in FIG. 1. The signal processing section 20*a* and the image processing section 40*a* are different from the signal processing section 20 and the image processing section 40 of the first embodiment in that the information obtained through the processing of the image processing section 40*a* is supplied as target objective information to the signal processing section 20*a*. Furthermore, the contents of the processing executed in these processing sections 20*a* and 40*a* are different from those of the first embodiment in the following manner.

First of all, the image processing section 40*a* of the image recognizing apparatus 3*a* makes a grouping of pixels based on pixel data supplied from the CCD camera 30 and extracts a region where the target objective is present. The shape of the extracted region is compared with the shape of model patterns being prepared beforehand to discriminate the type of the target objective and to obtain the height (e.g., vehicle height), width (e.g., vehicle width), area or the like of the target objective based on the size or largeness of the extracted region in the up-and-down direction as well as in the right-and-left direction. Then, the image processing section 40*a* transmits the attribute of each target objective (e.g., automotive vehicle/non-vehicle objective) as well as the size or largeness of each target objective (height, width, area), as target objective information, to the FMCW radar apparatus 1*a*.

Next, the main processing repetitively executed in the signal processing section 20*a* of the FMCW radar apparatus 1*a* will be explained with reference to the flowchart of FIG. 7. According to this embodiment, the extraction threshold used in the processing for extracting the peak frequency component is set for each frequency component resulting from the frequency analysis (refer to step S32).

According to this processing, the signal processing section 20*a* executes attribute adding processing for making the recognized target objective in the previous cycle match with target objective information supplied from the image processing section 40*a* (refer to step S31). Then, the signal processing section 20*a* executes frequency peak threshold setting processing for setting a threshold used in extracting the peak frequency component based on the processing result in the attribute adding processing (refer to step S32).

Figure 8:
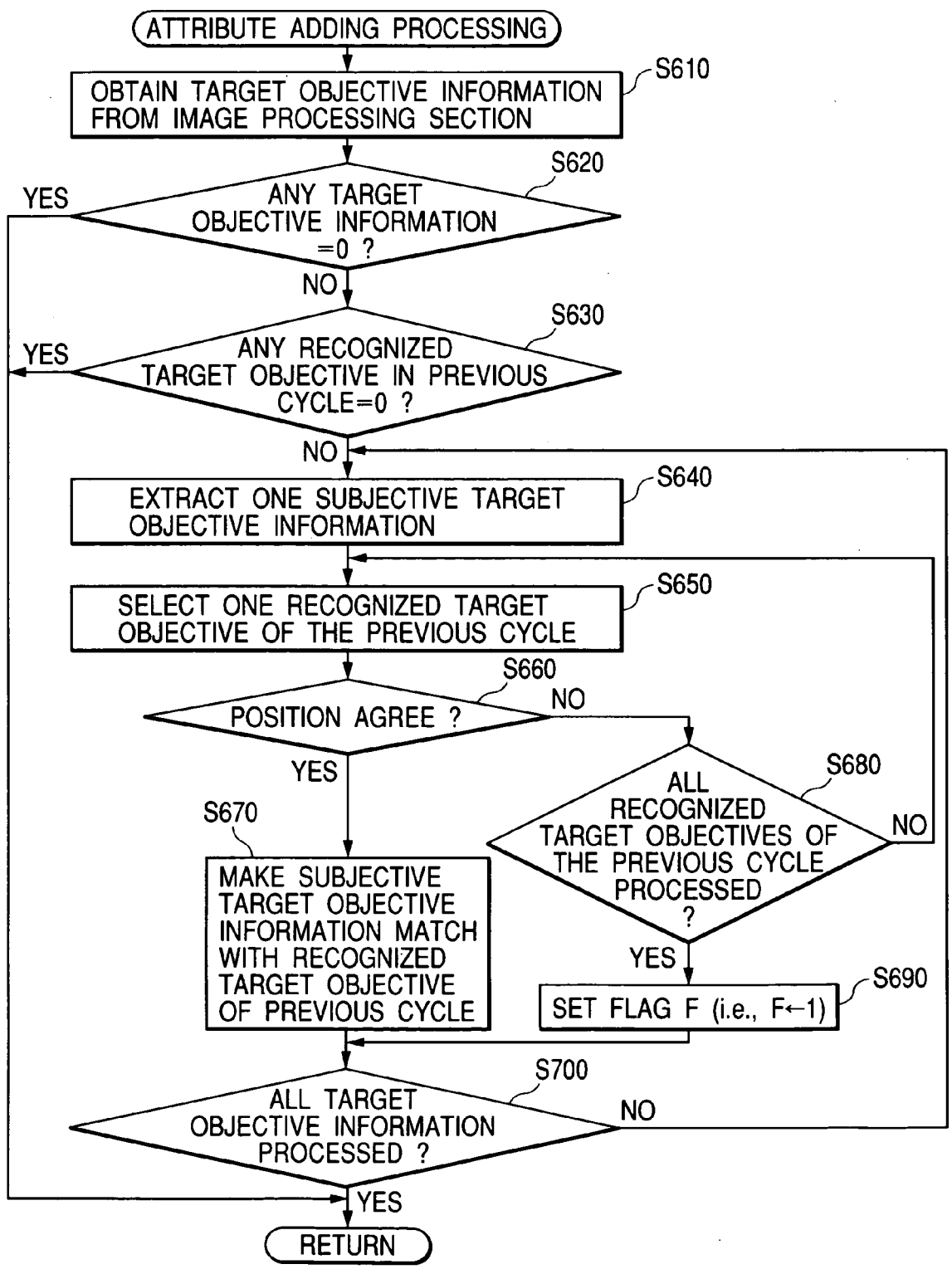
FIG. 8 is a flowchart showing the details of attribute adding processing in accordance with the second embodiment of the present invention.

More specifically, according to the attribute adding processing executed in the step S31, as shown in FIG. 8, the signal processing section 20*a* first obtains the target objective information from the image processing section 40 (refer to step S610). Then, the signal processing section 20*a* makes a judgment as to whether or not there is any target objective information obtained from the image processing section 40 (refer to step S620). When there is no target objective information (i.e., YES in step S620), the signal processing section 20*a* terminates this routine immediately. When there is any target objective information (i.e., NO in step S620), the signal processing section 20*a* further makes a judgment as to whether or not there was any recognized target objective in the previous cycle (refer to S630).

When there was no recognized target objective in the previous cycle (i.e., YES in step S630), the signal processing section 20*a* terminates this routine immediately. When there was any recognized target objective (i.e., NO in step S630), the signal processing section 20*a* extracts or selects one of the obtained target objective information (refer to step S640) to execute the following processing (refer to step S650 to S690) with respect to the extracted target objective information (hereinafter, referred to as "subjective target objective information."

More specifically, the signal processing section 20*a* selects one of the recognized target objectives of the previous cycle (refer to step S650). Then, the signal processing section 20*a* makes a judgment as to whether or not the position of the selected recognized target objective of the previous cycle agrees with the position of a target objective specified based on the subjective target objective information (refer to step S660). When these positions agrees with each other (i.e., YES in step S660), the signal processing section 20*a* makes the subjective target objective information match with the recognized target objective of the previous cycle chosen in the step S650 (refer to step S670).

On the other hand, when these positions disagree with each other (i.e., NO in step S660), the signal processing section 20*a* further makes a judgment as to whether or not the comparison processing of the step S660 is thoroughly executed for all of the recognized target objectives of the previous cycle (refer to step S680). When there is any unprocessed recognized target objective of the previous cycle (i.e., NO in step S680), the control flow returns to the step S650. The unprocessed recognized target objective of the previous cycle is subjected to the above-described processing in the same manner. On the other hand, when there is no unprocessed recognized target objective of the previous cycle (i.e., YES in step S680), the signal processing section 20*a* sets a flag F (i.e., F←1) which indicates that no matching is recognized for the processed subjective target objective information (refer to step S690).

Then, after accomplishing the processing of the step S670 or S690, the signal processing section 20*a* makes a judgment as to whether or not the above-described processing (refer to steps S650 to S690) is thoroughly executed for all of the target objective information obtained in the step S610 (refer to step S700). When there is any unprocessed target objective information (i.e., NO in step 700), the control flow returns to the step S640. The unprocessed target objective information is subjected to the above-described processing in the same manner. On the other hand, when there is no unprocessed target objective information, the signal processing section 20*a* terminates this routine immediately.

More specifically, by executing the attribute adding processing, the target objective information obtained by the image processing section 40*a* can be matched with a recognized target objective of the previous cycle. When no corresponding recognized target objective of the previous cycle is present, the flag F indicating no matching is set.

Figure 9:
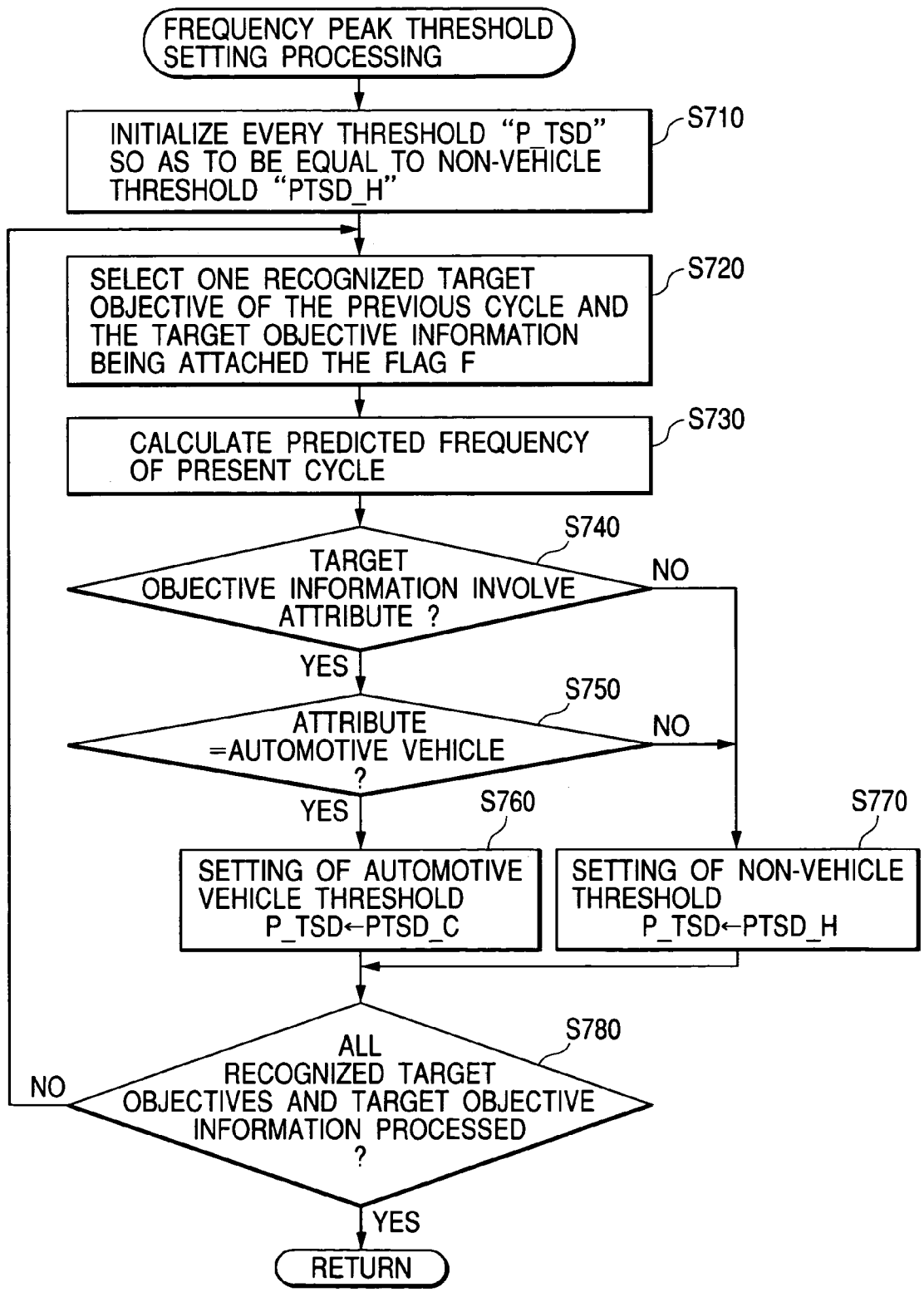
FIG. 9 is a flowchart showing the details of extraction threshold setting processing in accordance with the second embodiment of the present invention.
Figure 10:
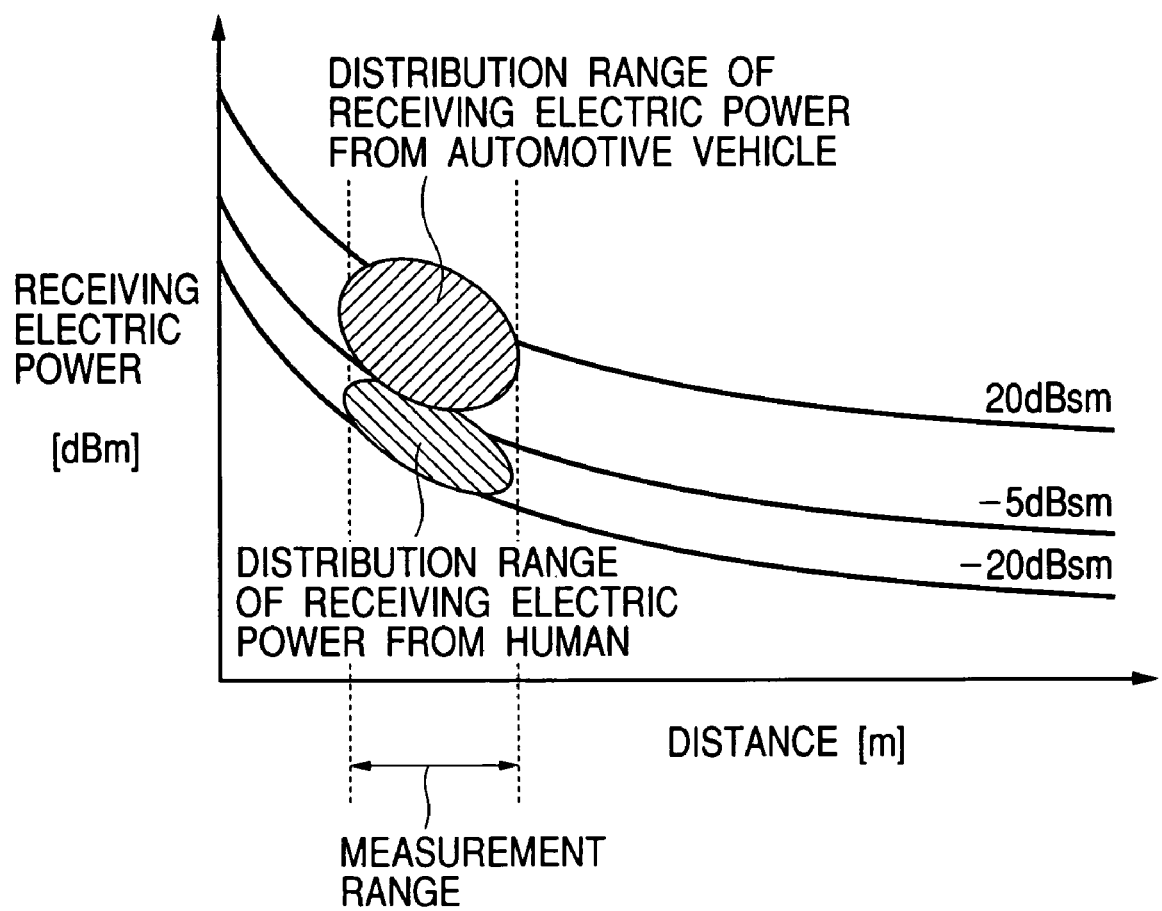
FIG. 10 is a graph showing the result of measurement with respect to a relationship between the distance of a target objective and a receiving electric power.
Figure 11A:
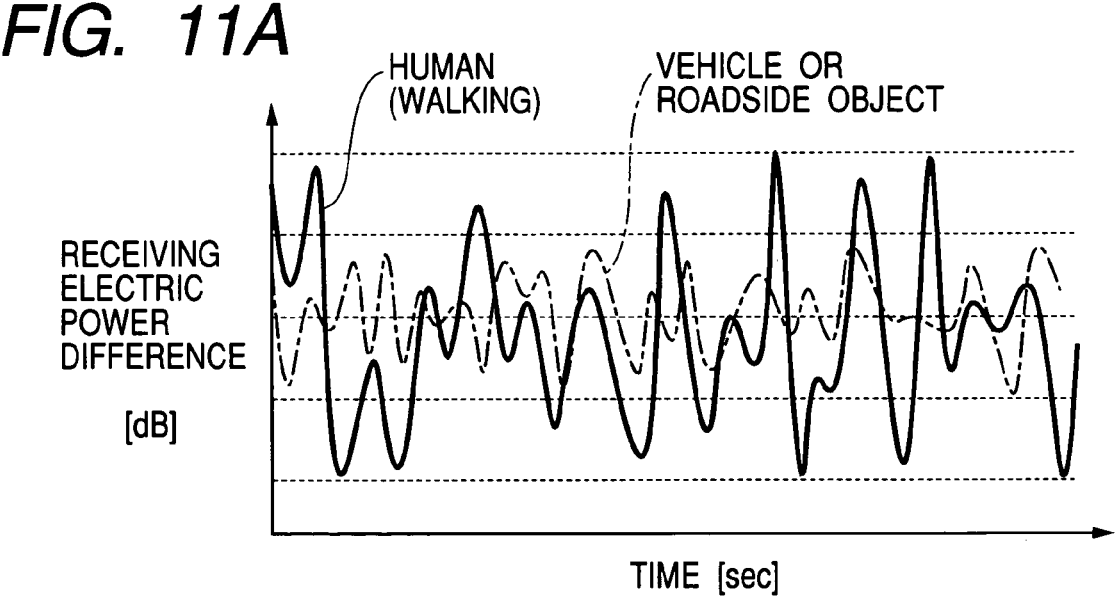
FIG. 11A is a graph showing the result of measurement with respect to the receiving electric power difference between an ascending section and a descending section.
Figure 11B:
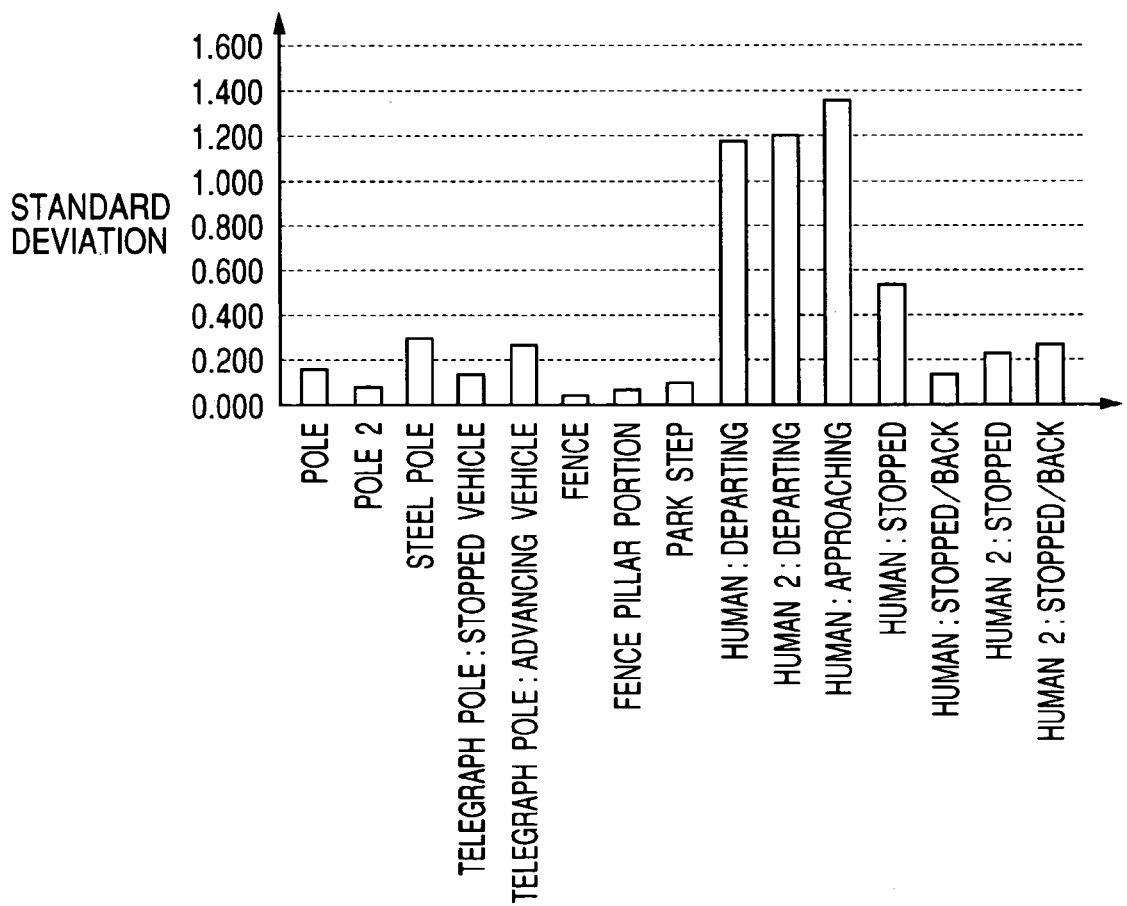
FIG. 11B is a graph showing standard deviations of various objectives calculated with respect to the measurement result of the receiving electric power difference.

FIG. 9 is a flowchart showing the details of the frequency peak threshold setting processing executed in the step S32. First, the signal processing section 20*a* initializes every extraction threshold P_TSD so as to be equal to a threshold PTSD_H for a non-vehicle objective (refer to step S710). The extraction threshold P_TSD is arbitrarily set for each frequency component. According to this embodiment, the threshold PTSD_H is set to be −20 dBsm. Then, the signal processing section 20*a* selects one recognized target objective of the previous cycle and one target objective information being attached the flag F (refer to step S720), and executes the following processing (refer to steps S730 to S770) applied to the extracted object (hereinafter, referred to "subjective target objective").

First, the signal processing section 20*a* obtains a frequency (hereinafter, referred to as "predicted frequency") where the peak frequency component should be extracted in the measurement of the present cycle based on the reflected radio waves returning from the subjective target objective (refer to step S730). Next, the signal processing section 20*a* makes a judgment as to whether or not the subjective target objective selected in the step S720 is the target objective information being attached the flag F or the recognized target objective of the previous cycle being matched with the target objective information, and also whether or not the target objective information involves the attribute of the target objective (refer to step S740). When the attribute of the target objective is set, the signal processing section 20*a* makes a judgment as to whether this attribute is an automotive vehicle or not (refer to step S750). When the attribute is the automotive vehicle (i.e., YES in step S750), the extraction threshold P_TSD for the frequency component in the vicinity of the predicted frequency obtained in the step S730 is set to be equal to a threshold PTSD_C for an automotive vehicle (refer to step S760). According to this embodiment, the automotive vehicle threshold PTSD_C is set to be equal to −5 dBsm.

On the other hand, when the judgment of step S740 reveals that the subjective target objective extracted in the step S720 is a recognized target objective of the previous cycle being not matched with the target objective information or reveals that the target objective information is not assigned the attribute of the target objective, or when the judgment of step S750 reveals that the attribute is not the automotive vehicle, the extraction threshold P_TSD for the frequency component in the vicinity of the predicted frequency obtained in the step S730 is set to be equal to a threshold PTSD_H for a non-vehicle objective (refer to step S770).

After accomplishing the setting of extraction threshold P_TSD in the step S760 or in the step S770, the signal processing section 20a makes a judgment as to whether or not the above-described processing (i.e., steps S730 to S770) is thoroughly executed for all of the recognized target objectives of the previous cycle and all of the target objective information being attached the flag F (refer to step S780). When there is any unprocessed recognized target objective or any target objective information (i.e., NO in step S780), the control flow returns to step S720 to repeat the same processing. On the other hand, when the processing for all of the recognized target objectives and the target objective information is accomplished (i.e., YES in step S780), the signal processing section 20a terminates this routine.

Figure 7:
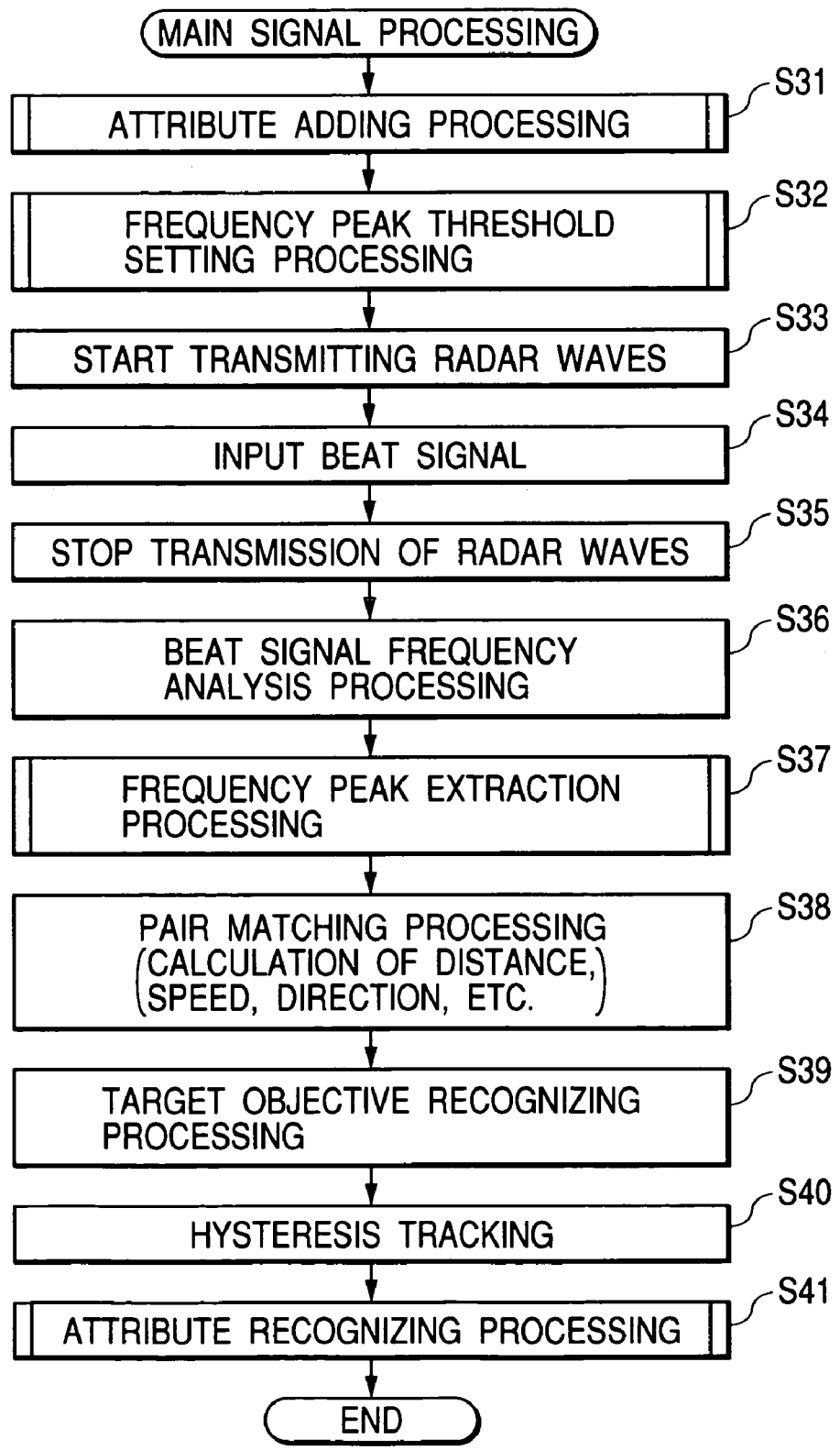
FIG. 7 is a flowchart showing the contents of main processing executed by a signal processing section in accordance with the second embodiment of the present invention.

After accomplishing the frequency peak threshold setting processing, the control flow returns to the succeeding steps S33 to S41 of FIG. 7 which are substantially identical with the above-described steps S11 to S19 of the first embodiment. More specifically, the signal processing section 20a appropriately changes or adjusts the value of extraction threshold P_TSD used in extracting the peak frequency component based on the attribute of the target objective discriminated by the image processing section 40a.

Accordingly, the FMCW radar apparatus 1a constituting part of the target objective discriminating system of this invention brings the effects of the first embodiment. Furthermore, in the processing for extracting the peak frequency component, the FMCW radar apparatus 1a sets a higher extraction threshold P_TSD in the frequency region where the presence of a peak based on the reflected radio waves returning from an automotive vehicle is predicted. Thus, it becomes possible to surely prevent noise of unnecessary peaks from be erroneously extracted. Furthermore, the FMCW radar apparatus 1a sets a lower extraction threshold P_TSD in the frequency region where the presence of a peak based on the reflected radio waves returning from a non-vehicle objective is predicted. Thus, it becomes possible to surely extract the peak to be extracted even when the signal intensity of reflected radio waves is small. Reliability in extracting the peak is improved.

Although this embodiment changes the extraction threshold P_TSD in accordance with the judgment as to whether or not the target objective is an automotive vehicle. However, it is possible to change the extraction threshold P_TSD in accordance with the distance of a target objective and the size of the target objective (e.g., height, width, projection area, and depth). Furthermore, according to this embodiment, the image recognizing apparatus 3a functions as the second target objective detecting means of the present invention. The processing executed in the step S37 represents the operation of the peak extracting means of the present invention. The processing executed in the step S730 represents the operation of the predicting means of the present invention. And, the processing executed in the steps S740 to S770 represents the operation of the extraction threshold varying means of the present invention.

What is claimed is:

1. A method for discriminating a target objective, comprising the steps of:
   transmitting and receiving radio waves for detecting a target objective based on radio waves reflected from said target objective;
   obtaining automotive vehicle judgment data based on a receiving intensity of reflected radio waves from said target objective, as a value expressed in terms of a radar cross section equivalent to said receiving intensity; and
   making a judgment as to whether said target objective is an automotive vehicle or not based on said automotive vehicle judgment data.

2. A method for discriminating a target objective, comprising the steps of:
   transmitting and receiving radio waves for detecting a target objective based on radio waves reflected from said target objective, said radio waves being modulated so as to have an ascending section in which the frequency gradually increases and a descending section in which the frequency gradually decreases;
   obtaining human objective judgment data based on a receiving intensity of reflected radio waves from said target objective obtained in each of said ascending section and said descending section, as a value representing temporal dispersion in the receiving intensity difference between said ascending section and said descending section; and
   making a judgment as to whether said target objective is a human objective or not based on said human objective judgment data.

3. A system for discriminating a target objective, comprising:
   target objective detecting means for transmitting and receiving radio waves to detect a target objective based on radio waves reflected from said target objective;
   automotive vehicle judgment data producing means for producing automotive vehicle judgment data based on a receiving intensity of reflected radio waves from said target objective detected by said target objective detecting means, as a value expressed in terms of a radar cross section equivalent to said receiving intensity; and
   automotive vehicle discriminating means for making a judgment as to whether said target objective is an automotive vehicle or not based on said automotive vehicle judgment data.

4. The target objective discriminating system in accordance with claim 3, further comprising
   image processing means for detecting said target objective and specifying the type of said target objective based on image data obtained by picking up an image of an area including at least a detection area of said target objective detecting means, and
   said image processing means makes a judgment as to whether said target objective is a human objective or not when said automotive vehicle discriminating means identifies said target objective as being not an automotive vehicle.

5. A system for discriminating a target objective, comprising:
   target objective detecting means for transmitting and receiving radio waves for detecting a target objective based on radio waves reflected from said target objective, said radio waves being modulated so as to have an ascending section in which the frequency gradually increases and a descending section in which the frequency gradually decreases;

human objective judgment data producing means for producing human objective judgment data based on a receiving intensity of reflected radio waves from said target objective detected by said target objective detecting means in each of said ascending section and said descending section, as a value representing temporal dispersion width in the receiving intensity difference between said ascending section and said descending section; and human objective discriminating means for making a judgment as to whether said target objective is a human objective or not based on said human objective judgment data.

6. The target objective discriminating system in accordance with claim 5, wherein said human objective judgment data producing means uses a standard deviation as said human objective judgment data to be produced.

7. The target objective discriminating system in accordance with claim 5, further comprising:

automotive vehicle judgment data producing means for producing automotive vehicle judgment data based on a receiving intensity of reflected radio waves from said target objective detected by said target objective detecting means, as a value expressed in terms of a radar cross section equivalent to said receiving intensity; and automotive vehicle discriminating means for making a judgment as to whether said target objective is an automotive vehicle or not based on said automotive vehicle judgment data.

8. The target objective discriminating system in accordance with claim 7, wherein said automotive vehicle judgment data producing means uses an average of received signal intensities detected in said ascending section and said descending section as said receiving intensity.

9. The target objective discriminating system in accordance with claim 5, wherein said target objective detecting means serves as a primary target objective detecting means and, said target objective discriminating system further comprises a secondary target objective detecting means for detecting a target objective existing in a detection area of said primary target objective detecting means based on a method different from that used by said primary target objective detecting means and for specifying an attribute of the detected target objective, wherein said primary target objective detecting means comprises:

peak extracting means for extracting a peak frequency component in each of said ascending section and said descending section based on a beat signal which is obtained by mixing transmitted and received radio wave signals, said peak frequency component representing a frequency component where a signal intensity becomes a peak and larger than a predetermined extraction threshold;

predicting means for predicting, based on a position of said target objective detected by said secondary target objective detecting means, a frequency region where the peak frequency component corresponding to said target objective is extracted by said peak extracting means;

extraction threshold varying means for varying said extraction threshold used in said peak extracting means at the frequency region predicted by said predicting means, based on the attribute of said target objective specified by said secondary target objective detecting means; and target objective is detected by combining peak frequency components extracted by said peak extracting means.

10. The target objective discriminating system in accordance with claim 9, wherein the attribute to be specified by said secondary target objective recognizing means includes at least one of categories consisting of type, material, size of said target objective.

11. A program installable in a computer system for causing said computer system to function or operate as a target objective discriminating system comprising:

target objective detecting means for transmitting and receiving radio waves to detect a target objective based on radio waves reflected from said target objective;

automotive vehicle judgment data producing means for producing automotive vehicle judgment data based on a receiving intensity of reflected radio waves from said target objective detected by said target objective detecting means, as a value expressed in terms of a radar cross section equivalent to said receiving intensity; and automotive vehicle discriminating means for making a judgment as to whether said target objective is an automotive vehicle or not based on said automotive vehicle judgment data.

12. A program installable in a computer system for causing said computer system to function or operate as a target objective discriminating system comprising:

target objective detecting means for transmitting and receiving radio waves for detecting a target objective based on radio waves reflected from said target objective, said radio waves being modulated so as to have an ascending section in which the frequency gradually increases and a descending section in which the frequency gradually decreases;

human objective judgment data producing means for producing human objective judgment data based on a receiving intensity of reflected radio waves from said target objective detected by said target objective detecting means in each of said ascending section and said descending section, as a value representing temporal dispersion width in the receiving intensity difference between said ascending section and said descending section; and human objective discriminating means for making a judgment as to whether said target objective is a human objective or not based on said human objective judgment data.

13. The method in accordance with claim 1, wherein the making a judgment is performed automatically, by a computer.

14. The method in accordance with claim 2, wherein the making a judgment is performed automatically, by a computer.

15. The system in accordance with claim 3, wherein the making a judgment is performed automatically, by a computer.

16. The system in accordance with claim 5, wherein the making a judgment is performed automatically, by a computer.

17. The program in accordance with claim 11, wherein the making a judgment is performed automatically, by said computer system.

18. The program in accordance with claim 12, wherein the making a judgment is performed automatically, by said computer system.

* * * * *